United States Patent
Handlogten

(10) Patent No.: US 7,451,171 B1
(45) Date of Patent: Nov. 11, 2008

(54) SYSTEMS, METHODS AND COMPUTER PROGRAM PRODUCTS FOR HARDWARE ASSISTS FOR MICROCODED FLOATING POINT DIVIDE AND SQUARE ROOT

(75) Inventor: Glen H. Handlogten, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/059,055

(22) Filed: Mar. 31, 2008

(51) Int. Cl.
*G06F 7/552* (2006.01)
*G06F 7/44* (2006.01)

(52) U.S. Cl. .................... 708/500; 708/504
(58) Field of Classification Search ........... 708/500, 708/504
See application file for complete search history.

(56) References Cited

U.S. PATENT DOCUMENTS

| | | | |
|---|---|---|---|
| 4,879,676 A | 11/1989 | Hansen | |
| 5,058,048 A | 10/1991 | Gupta et al. | |
| 5,995,991 A * | 11/1999 | Huang et al. | 708/495 |
| 6,009,511 A * | 12/1999 | Lynch et al. | 708/495 |
| 2003/0014454 A1* | 1/2003 | Steele, Jr. | 708/500 |

* cited by examiner

*Primary Examiner*—Tan V Mai
(74) *Attorney, Agent, or Firm*—Cantor Colburn LLP

(57) ABSTRACT

Systems, methods and computer program products for hardware assists for microcoded floating point divide and square root operations. Exemplary embodiments include a method including receiving a first microcoded instruction in the pipeline, decoding the first microcoded instruction in a decode stage of the pipeline, initiating a microcode engine coupled to the processor, with the microcode engine configured to process the streamlined microcode routine. During the delay between detecting the need to start a microcode routine and seeing the first microcode instruction actually issued, and using the processor cycle intended for the original instruction, hardware prepares for the microcode by pre-normalizing the operand, writing the pre-normalized operand to a scratch register coupled to the processor, conditionally generating a final result and discarding microcode routine instructions subsequent to the first microcode routine instruction and copying a final result from the scratch register to a floating point architectural register associated with the processor.

1 Claim, 3 Drawing Sheets

SYSTEMS, METHODS AND COMPUTER PROGRAM PRODUCTS FOR HARDWARE ASSISTS FOR MICROCODED FLOATING POINT DIVIDE AND SQUARE ROOT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to microcoded instructions, and particularly to systems, methods and computer program products for hardware assists for microcoded floating point divide and square root operations.

2. Description of Background

The A2 core is a four threaded processor. While most instructions are executed using dedicated hardware, the floating point divide (fdiv(s)(.)) and square root (fsqrt(s)(.)) instructions are microcoded. Whenever a microcoded instruction is decoded, a signal is sent out to abort the instruction and all instructions following it in the pipeline. The same signal also starts the execution of the microcode routine for the microcoded instruction. A streamlined microcode sequence that handles the majority of operands for division or square root can be written with about 12 instructions. Handling all possible operands requires branches in the microcode and adds many more instructions to the main line code. Branching on various floating point operand classifications can be difficult. For example, the operand(s) would need to be copied from the floating point architectural registers (FPR(s)) to the general purpose registers (GPR(s)), requiring GPR(s) to first be saved and later restored. Alternatively, a new Floating point operation that examines an FPR and writes results into a register in the Instruction Issue Unit would need to be constructed. The microcode would need to branch based on the contents of this new register (i.e., detect read-after-write (RAW) dependency). Currently, the microcode engine of A2 processor does not support any branching.

SUMMARY OF THE INVENTION

Exemplary embodiments include a method in a processor having a pipeline, the method providing hardware assists for microcoded floating point divide and square root operations, and including receiving a first microcoded instruction in the pipeline, decoding the first microcoded instruction in a decode stage of the pipeline, flushing subsequent instructions already in the pipeline, initiating a microcode engine coupled to the processor, the microcode engine configured to process the microcode routine, during a 6-cycle period after receiving the original microcoded (divide or square root) instruction in the pipeline, determining whether operands associated with the microcoded instruction are de-normalized, in response to a determination that an operand associated with the microcode routine is de-normalized, pre-normalizing the operand, writing the pre-normalized operand to a scratch register coupled to the processor, in response to an operand being a normalized number, copying the operand into the scratch register. Also included are embodiments for conditionally discarding microcode routine instructions subsequent to the first microcode routine instruction and writing a final microcode result to a floating point architectural register associated with the processor, wherein the pipeline slot of the pipeline is reserved for microcode instructions selected from the group consisting of divide; denormalized divisor (implicit bit=0, ie fraction=0.XXX ... X); either operand is an SNaN (Signaling Not a Number); either operand is a QNaN (Quiet Not a Number); normalized/0; 0/0; Inf/Inf; 0/X; X/Inf; Inf/X; square root; denormalized operand; operand is an SNaN; operand is a QNaN; Sqrt(<0); Sqrt(−0); Sqrt(0); and Sqrt (Inf), and producing a final result and copying the result from the scratch register to a floating point architectural register associated with the processor.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which includes hardware having the ability to augment and in some cases supplant microcode to implement a streamlined branch free microcode sequence optimized for the majority of the operands.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
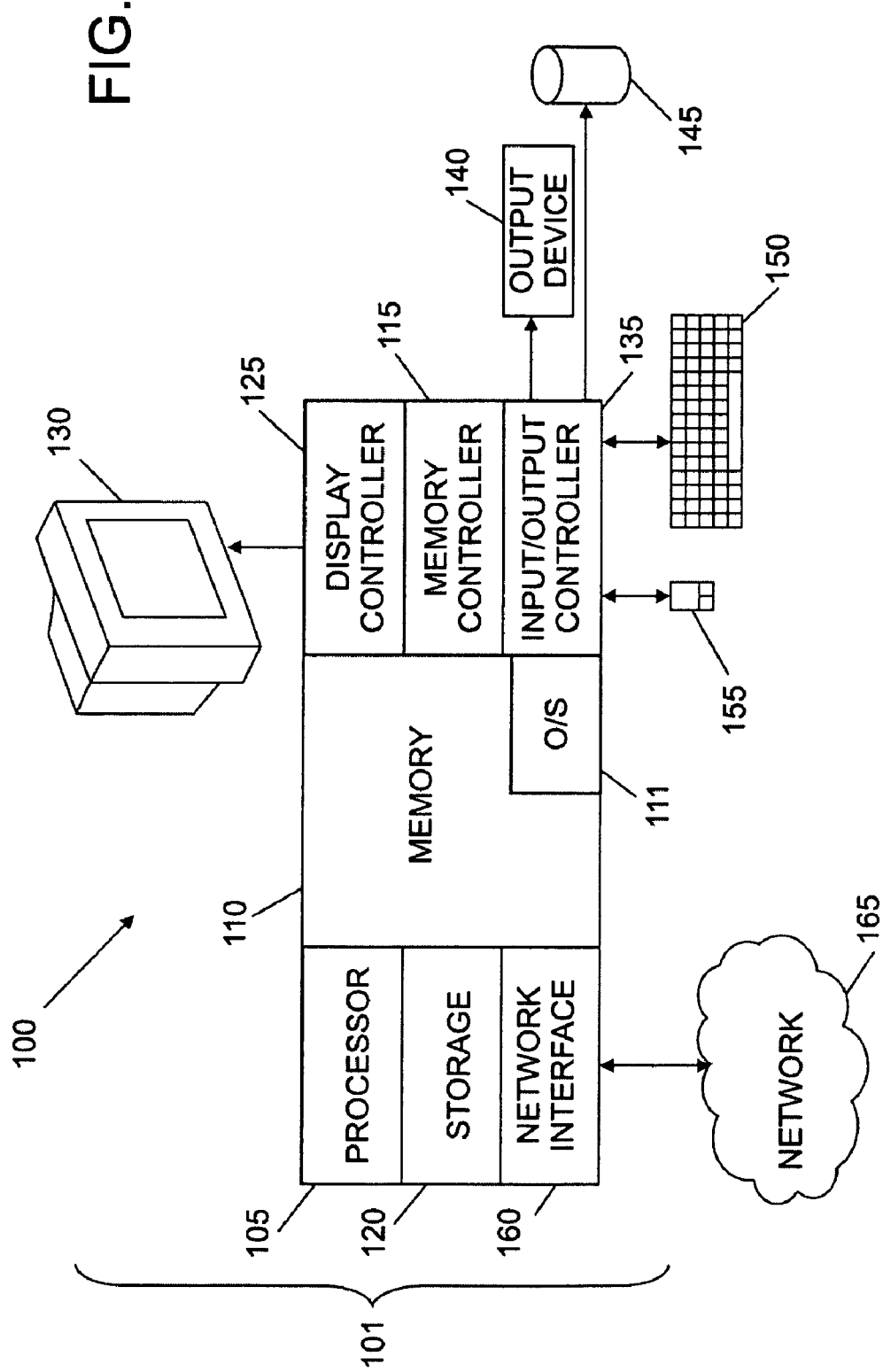
FIG. 1 illustrates an exemplary embodiment of a system for hardware assists for microcoded floating point divide and square root operations.

The detailed description explains the preferred embodiments of the invention, together with advantages and features, by way of example with reference to the drawings.

DETAILED DESCRIPTION OF THE INVENTION

In exemplary embodiments, the systems and methods described herein implement hardware to augment and in some cases supplant microcode to implement a streamlined branch free microcode sequence optimized for the majority of the operands. In exemplary embodiments, the systems and methods described herein discard part of a microcode routine when the hardware, on its own, is able to produce the special case result. In exemplary embodiments, the systems and methods described herein further pre-normalize de-normalized data and then redirect reads of this data to temporary register to which the normalized data is written.

As an illustrative example, The IBM PowerPC architecture specifies that the floating point unit (FPU) must have 32 floating point registers (FPRs). All Floating Point (FP) source operands are read from, and all FP results are written to these registers, which can be accessed very quickly compared to memory. The scratch registers are extra registers that are only available to the microcode—they cannot be accessed by user code. In the case of A2 there are 4 scratch registers. If a processor supports 4 threads (like the A2 processor) there are 4 sets of 32 FPRs and 4 sets of 4 scratch registers. Although each thread has its own set of registers, there is a single arithmetic unit (single adder, single multiplier, etc) that all thread share. The PowerPC floating point instructions are of the form: Divide FRT←FRA/FRB; and Square root FRT←FRB, where FRT is the Floating Point Register Target, and FRA, FRB designate the source operands. For both divide and square root the first step is reading a value (often called a seed) from a table (the look-up table) indexed with the b operand (FRB). The divide look-up table holds a reciprocal estimate (rough approximation of 1/FRB) and the square root table holds a reciprocal square root estimate (rough approximation of the 1/(square root)). PowerPC has both a single precision (fdivs) and a double precision (fdiv) floating point divide. The "." represents a record form of the instruction that saves extra status information. "fdiv(s)(.)" is used to represent the four possible combinations of divide and "fsqrt(s)(.)" represents all 4 square root instruction.

Currently, certain processors, such as the IBM PowerPC execute the easy sequences in hardware and force difficult sequences to microcode (e.g., a memory move where the source and destination overlap). In some processors for example, for floating-point operations, multiply-add sequences are forced to microcode in which the addend is denormalized and has exponent 53 to 106 greater than the product.

In exemplary embodiments, the systems and methods described herein can discard part of a microcode instruction sequence for certain operand values that the hardware generates the result. In exemplary embodiments, the systems and methods described herein can redirect the read of a the original FPR to a scratch register for de-normalized data and performing pre-normalization in cycles that would otherwise be wasted. The exemplary embodiments described herein further pre-normalize the operand prior to the time that the microcode commences.

FIG. 1 illustrates an exemplary embodiment of a system 100 for hardware assists for microcoded floating point divide and square root operations. The methods described herein can be implemented in software (e.g., firmware), hardware, or a combination thereof. In exemplary embodiments, the methods described herein are implemented in microcode, as an executable routine that is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions. It is appreciated that the processor 105 can include a plurality of registers including GPRs, FPRs, scratch registers, etc.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the microcode hardware assist methods described herein in accordance with exemplary embodiments and a suitable operating system (OS) 111. The operating system 111 essentially controls the execution of other computer programs, such the microcode hardware assist systems and methods described herein, and provides scheduling, input-output control, file and data management, memory management, and communication control and related services.

The microcode hardware assist methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the microcode hardware assist methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for, example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The microcode hardware assist methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The microcode hardware assist methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the microcode hardware assist methods are implemented in hardware, the microcode hardware assist methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
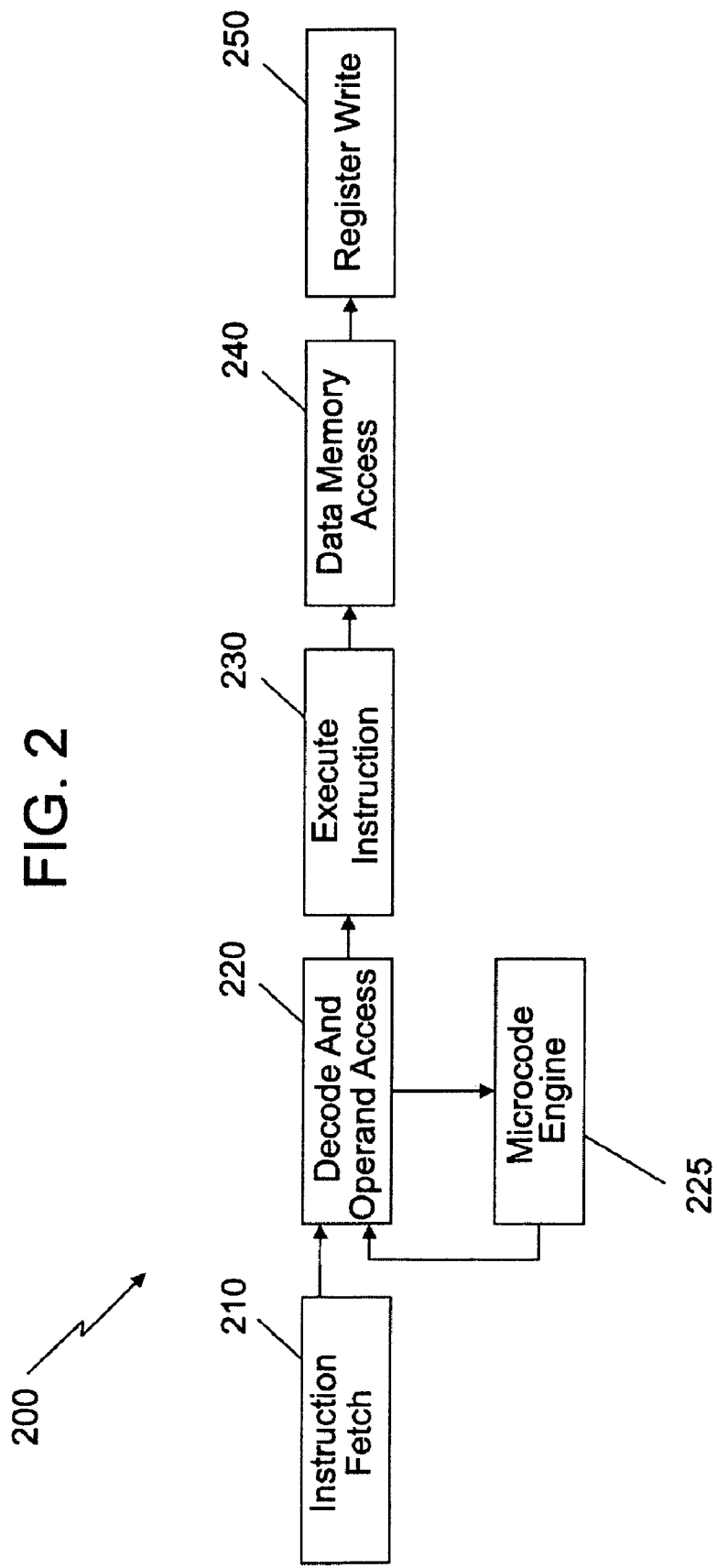
FIG. 2 illustrates a block diagram of a processor instruction pipeline system in which the exemplary microcode hardware assist methods can be implemented in accordance with an exemplary embodiment.

FIG. 2 illustrates a block diagram of a processor instruction pipeline system 200 in which the exemplary microcode hardware assist methods can be implemented in accordance with an exemplary embodiment. Processor 105 operations are sped up via a pipeline. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, a microcode engine 225 is further coupled to the Instruction fetch 210 and Decode and operand access 220 stages. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions which can include arithmetic logic unit (ALU) operations and floating point (FP) operations. The Data memory access 240 stage performs any data memory access functions associated with the instruction. The Write Register write 250 stage writes the appropriate result value into the register file. The pipeline system 200 can be enhanced by implementing the microprocessor 105 to include the microcode hardware assist methods as further described herein.

In exemplary embodiments, to attain a branch free microcode sequence optimized for the majority of the operands, the hardware augments and in some cases supplant the microcode. The cases that such a microcode routine will not handle include the following:

Floating point divide
    denormalized divisor (implicit bit=0, ie fraction= 0.XXX . . . X)
    either operand is an SNaN (Signaling Not a Number)
    either operand is a QNaN (Quiet Not a Number)
    normalized/0
    0/0
    Inf/Inf
    0/X.
    X/Inf
    Inf/X Floating point square root
    denormalized operand
    operand is an SNaN
    operand is a QNaN
    Sqrt(<0)
    Sqrt(−0)
    Sqrt(0)
    Sqrt(Inf)

In exemplary embodiments, when a microcoded instruction is decoded, subsequent instructions are flushed and the microcode engine is started. In A2 processor cores, a minimum of 6 cycles pass after seeing the original power-pc instruction in the decode stage before seeing the first instruction of the microcode routine in that same stage. This delay comes from emptying and then refilling the pipeline. In exemplary embodiments, during this (6-cycle) startup-up delay, the hardware pre-processes the operand(s) and covers all the cases that the microcode routine either cannot handle or with which assistance is needed.

Many of the cases discussed above have trivial results such as +/− infinity, +/− zero, or NaN (Not a Number), as defined in the IEEE floating point specification. In exemplary embodiments, a small amount of hardware is implemented to examine the operation and operands and produces the correct result. This result proceeds down the pipeline 200 and is written to a scratch register. The microcode proceeds normally but the hardware discards the instructions (before the code and operand access 220 stage) so the pipeline 200 is available to other threads. The microcode is structured in such a way that the final instruction essentially moves the contents of a scratch register to an FPR. The microcode routine is basically discarded by this new hardware. Only the final microcode instruction is allowed to proceed down the pipeline to move to the scratch register to the target FPR.

Remaining cases include denormalized operands. Unlike the above cases, obtaining results with these operands requires significant processing. In exemplary embodiments, the algorithm begins by obtaining a seed from a table in the hardware which is addressed using the most significant bits of the B operand and which assumes an implicit bit of 1. Therefore, table look-up requires normalized operands. In exemplary embodiments, the 6 cycle delay is used to unconditionally pre-normalize the B operand. The pre-normalized operand is written to a scratch register (same register that was used above). The microcode is then written in a way that assumes the B operand is in that scratch register rather than the original FPR. If the original operand was a normalized number, pre-normalizing it has no effect other than to copy it to the scratch register.

In both cases above, the pipeline 200 slot reserved for the original instruction [fdiv(s)(.) and fsqrt(s)(.)], is usurped to perform the required tasks. Since this processing slot had already been allocated to the instruction (by the code and operand access 220 stage logic), it would otherwise have been wasted. This allows the microcode to be written assuming normalized operands and with no special case handling required, thereby reducing the complexity of the microcode and allowing a branch free routine.

Figure 3:
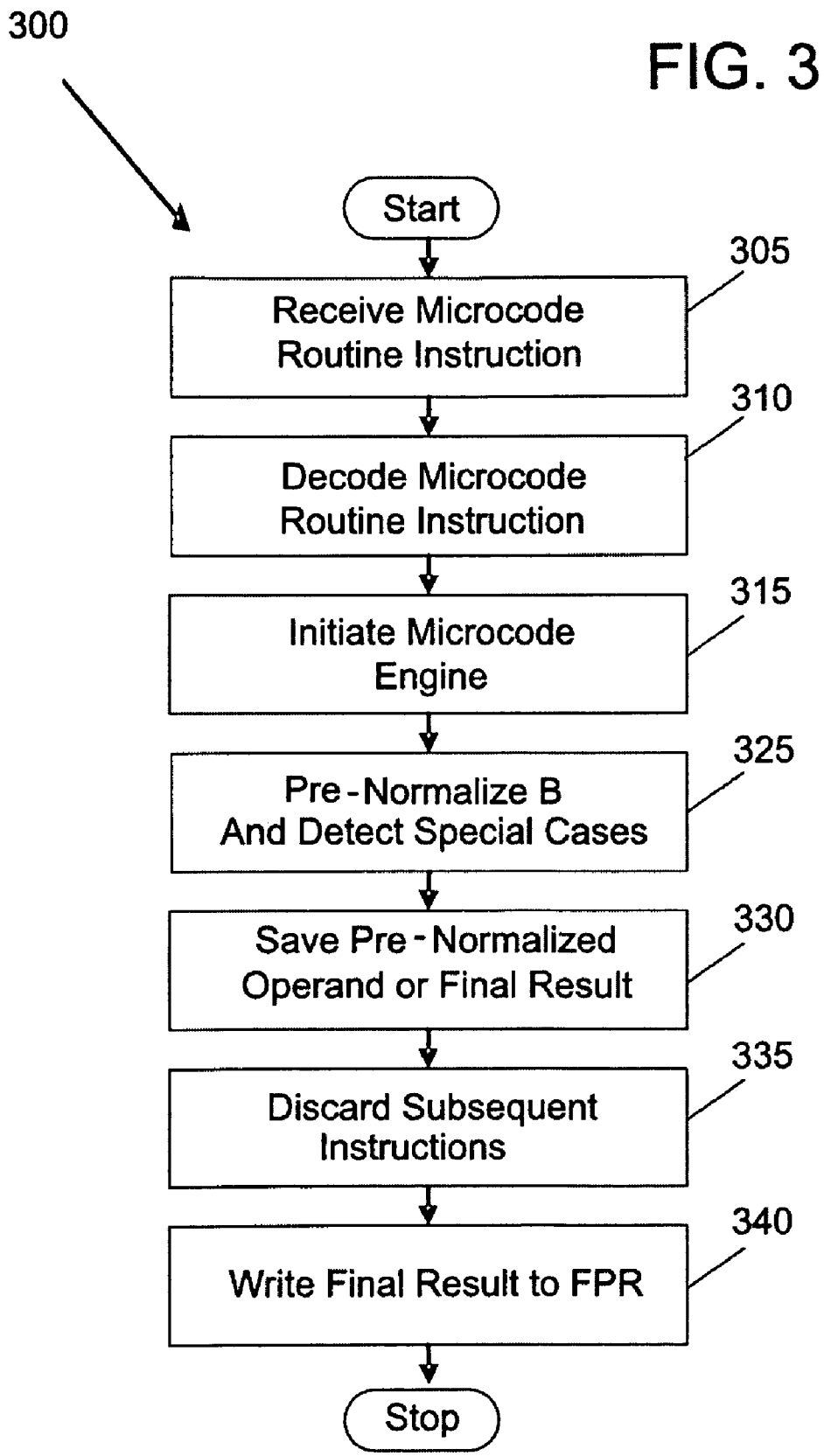
FIG. 3 illustrates a flowchart of a method for hardware assists for microcoded floating point divide and square root operations in accordance with exemplary embodiments.

FIG. 3 illustrates a flowchart of a method 300 for hardware assists for microcoded floating point divide and square root operations in accordance with exemplary embodiments. At block 305, the pipeline 200 receives a first divide or square root (microcoded) instruction. At block 310, the decode stage 220 of the pipeline 200 decodes the first microcoded instruction. At block 315, the system 100 initiates a microcode engine coupled to the processor 105, the microcode engine configured to process the microcode routine. In exemplary embodiments, for a 6-cycle period after receiving the original instruction in the pipeline 200, the system 100 then performs a series of steps on the operands as discussed above. At block 325, the hardware unconditionally Pre-Normalizes the B Operand and detects and special cases. At block 330, the algorithm saves the pre-normalized operand or if a special case is detected, saves the final result. In an exemplary embodiment, the algorithm writes the pre-normalized operand or final result to a scratch register coupled to the processor. At block 335, the pipeline 200 discards microcode routine instructions subsequent to the first microcode routine instruction, and at block 340 copies a final microcode result from the scratch register to a floating point architectural register associated with the processor 105. As discussed above, the pipeline 200 slot reserved for the original instruction [fdiv(s)(.) and fsqrt(s)(.)], is used to perform the desired task. In exemplary embodiments, the pipeline slot of the pipeline can be reserved for pre-processing including, but not limited to: de-normalized divisor (implicit bit=0, ie fraction=0.XXX . . . X); operand is an SNaN (Signaling Not a Number); operand is a QNaN (Quiet Not a Number); normalized/0; 0/0; Inf/Inf; 0/X; X/Inf; Inf/X; Sqrt(<0); Sqrt(−0); Sqrt(0); and Sqrt(Inf).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a processor having a pipeline, a method for providing hardware assists for microcoded floating point divide and square root operations, the method consisting of:
   receiving a first microcoded instruction in the pipeline;
   decoding the first microcoded instruction in a decode stage of the pipeline;
   flushing subsequent instructions already in the pipeline;
   initiating a microcode engine coupled to the processor, the microcode engine configured to process the microcode routine;
   for a 6-cycle period after receiving the microcoded instruction in the pipeline, performing in the instruction's pipeline slot of the pipeline:
   if an operand associated with the microcode routine is de-normalized, pre-normalizing the operand and writing the pre-normalized operand to a scratch register coupled to the processor;
   if an operand being a normalized number, copying the operand into the scratch register;
   determining whether operands associated with the instruction are a-typical and not dealt with by the streamlined microcode routine;
   wherein the pipeline slot reserved for microcode instructions is used to perform processing selected from the group consisting of: (for divide); de-normalized divisor (implicit bit=0, ie fraction=0.XXX . . . X); either operand is an SNaN (Signaling Not a Number); either operand is a QNaN (Quiet Not a Number); normalized/0; 0/0; Inf/Inf; 0/X; X/Inf; Inf/X; (for square root); de-normalized operand; operand is an SNaN; operand is a QNaN; Sqrt(<0); Sqrt(−0); Sqrt(0); and Sqrt(Inf); and
   producing a final result and copying the result from the scratch register to a floating point architectural register associated with the processor.

* * * * *